US012746667B2

(12) United States Patent
Kupcsik et al.

(10) Patent No.: US 12,746,667 B2
(45) Date of Patent: Sep. 29, 2026

(54) ACTUATION OF A ROBOT TO PERFORM COMPLEX TASKS

(71) Applicant: Robert Bosch GmbH, Stuttgart (DE)

(72) Inventors: Andras Gabor Kupcsik, Herrenberg (DE); Christian Graf, Dossenheim (DE); Christian Rauch, Stuttgart (DE); Patrick Kesper, Nufringen (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 18/738,113

(22) Filed: Jun. 10, 2024

(65) Prior Publication Data

US 2024/0416518 A1 Dec. 19, 2024

(30) Foreign Application Priority Data

Jun. 14, 2023 (DE) ..................... 10 2023 205 539.2

(51) Int. Cl.
*B25J 9/16* (2006.01)
*G05B 19/4155* (2006.01)

(52) U.S. Cl.
CPC ........... *B25J 9/1661* (2013.01); *B25J 9/1671* (2013.01); *B25J 9/1697* (2013.01); *G05B 19/4155* (2013.01); *G05B 2219/50391* (2013.01)

(58) Field of Classification Search
CPC ...... B25J 9/1661; B25J 9/1671; B25J 9/1697; G05B 19/4155; G05B 2219/50391;
(Continued)

(56) References Cited

U.S. PATENT DOCUMENTS

2013/0345876 A1* 12/2013 Rudakevych ............ B25J 9/104 700/259
2019/0005374 A1* 1/2019 Shankar ................... G06N 3/09
(Continued)

FOREIGN PATENT DOCUMENTS

DE 202017106506 U1 4/2018
DE 112018004584 T5 6/2020
(Continued)

OTHER PUBLICATIONS

Ahn et al., "Do as I Can, Not as I Say: Grounding Language in Robotic Affordances," 6th Conference on Robot Learning (Corl 2022), 2022, pp. 1-34.

*Primary Examiner* — Adam R Mott
*Assistant Examiner* — Sagar Kc
(74) *Attorney, Agent, or Firm* — Norton Rose Fulbright US LLP

(57) ABSTRACT

A method for actuating a robot to perform a task. In the method, at least one image of a scene is provided; object types are ascertained for object(s) in the image; the task is fed with the object types to a trained language model, the trained language model outputs a plurality of candidate actions; the candidate actions are evaluated with a progress metric to determine the extent to which the performance of the candidate action promises progress with regard to the predetermined task, and evaluated with a predetermined success metric to determine the probability with which an attempt to perform the candidate action will be successful; the values of the progress metric and the success metric are merged into an overall rating of the candidate action; a candidate action having the best overall rating is selected; and the robot is actuated to perform the selected candidate action.

17 Claims, 2 Drawing Sheets

(58) Field of Classification Search
CPC .......... G06F 40/30; G05D 1/243; G05D 1/43; G05D 1/648; G05D 2109/10; G06V 10/764; G06V 10/82
See application file for complete search history.

(56) References Cited

U.S. PATENT DOCUMENTS

| | | | | |
|---|---|---|---|---|
| 2019/0005670 | A1* | 1/2019 | DeTone | G06T 7/337 |
| 2019/0291277 | A1* | 9/2019 | Oleynik | B25J 9/1669 |
| 2020/0086483 | A1* | 3/2020 | Li | B25J 9/1653 |
| 2020/0250528 | A1* | 8/2020 | van den Oord | G06N 3/0985 |
| 2021/0078167 | A1* | 3/2021 | Khansari Zadeh | B25J 15/0028 |
| 2021/0110168 | A1* | 4/2021 | Yang | G06V 20/46 |
| 2023/0080133 | A1* | 3/2023 | Meier | G08G 1/166<br>382/103 |
| 2023/0166398 | A1* | 6/2023 | Fan | B25J 9/1653<br>700/255 |
| 2023/0271330 | A1* | 8/2023 | Sundaralingam | B25J 9/163<br>700/246 |
| 2023/0311335 | A1* | 10/2023 | Hausman | B25J 9/163<br>700/246 |

FOREIGN PATENT DOCUMENTS

| | | | | |
|---|---|---|---|---|
| DE | 112020000009 T5 | 10/2020 | | |
| DE | 102020106714 A1 | 12/2020 | | |
| DE | 102019122790 B4 | 3/2021 | | |
| DE | 102020128653 A1 | 5/2021 | | |
| DE | 102021121063 A1 | 3/2022 | | |
| DE | 102022103493 A1 | 8/2022 | | |
| DE | 102021209646 A1 | 3/2023 | | |
| DE | 102022129008 A1 | 6/2023 | | |
| WO | WO-2023096011 A1 * | 6/2023 | | G06V 20/70 |

* cited by examiner

ACTUATION OF A ROBOT TO PERFORM COMPLEX TASKS

CROSS REFERENCE

The present application claims the benefit under 35 U.S.C. § 119 of German Patent Application No. DE 10 2023 205 539.2 filed on Jun. 14, 2023, which is expressly incorporated herein by reference in its entirety.

FIELD

The present invention relates to actuating a robot to perform a predetermined task on the basis of images of a scene in which the task is to be performed.

BACKGROUND INFORMATION

Robots can perform manipulation tasks with high precision and, in particular, with high repeatability. However, they must be actuated separately for each individual work step. Before the robot can process a complex task, the task must first be broken down into subtasks that can then be processed by the robot. The added benefit of having the robot automate the task is therefore offset by the effort required to manually break the task down into subtasks.

M. Ahn et al., "Do As I Can, Not As I Say: Grounding Language in Robotic Affordances," arXiv: 2204.01691v2 (2022) describes an approach for at least partially automating the decomposition of a complex task into subtasks using the semantic information contained in a trained language model, such as GPT-3.

SUMMARY

The present invention provides a method for actuating a robot to perform a predetermined task.

According to an example embodiment of the present invention, as part of this method, at least one image of a scene in which the task is to be performed is provided. The image(s) can in particular be recorded, for example, with a camera that is carried by the robot and/or monitors the environment in which the robot operates. Any imaging modalities can be used and also fused with each other.

Object types are ascertained for one or more objects in the image. This means that an object type is assigned to one or more pixels belonging to the particular object. This assignment can optionally be even more detailed and, for example, differentiate between different regions of the object that serve different purposes. In particular, the ascertainment of object types can be automated to any degree. In a particularly advantageous embodiment, a trained image classifier can be used for this purpose. Alternatively or in combination therewith, the object types can also be annotated by the user, for example.

The task to be processed is fed to a trained language model in combination with the object types. The trained language model then outputs a number of candidate actions. In particular, these candidate actions can comprise, for example, actions that can be performed on objects of the recognized object types, such as "search for," "pick up," and "put down," as well as any other actions specific to the particular object.

The candidate actions are then evaluated based on the current scene and the object types ascertained therefrom.

According to an example embodiment of the present invention, one aspect of this evaluation is a predetermined progress metric. This progress metric measures the extent to which the performance of the particular candidate function promises progress with regard to the predetermined task. In particular, this metric can be used to filter out candidate actions that are associated by the language model with the objects and the predetermined task without actually having anything to do with this task. For example, if the task is to "collect all the fruits" and the scene contains a plurality of types of fruits that are used together in a well-known cocktail, a language model trained on the basis of everyday texts can associate the combination of the task and the object types with, among other things, "mixing a cocktail," "going on vacation" or "enjoying an evening on the beach."

According to an example embodiment of the present invention, a further aspect of the evaluation is a predetermined success metric. This success metric measures the probability with which an attempt to perform the candidate action will be successful. In this way, dependencies between a plurality of steps to be carried out sequentially can be taken into account. For example, an attempt to grab an object and move it to another location will only be successful if the exact position of this object has been located in a previous step.

The values of the progress metric and the success metric relating to the candidate action are merged to form an overall rating for the candidate action. This overall rating is not limited to a mere numerical aggregation. In the aforementioned example with the task to "collect all the fruits," the associations "mixing a cocktail," "going on vacation" or "enjoying an evening on the beach" can be eliminated solely on the basis of a poor rating by the progress metric. This cannot be "remedied" by a particularly good evaluation of the success metric.

A candidate action with the best overall rating is selected. The robot is actuated to perform the selected candidate action.

It has been recognized that the use of object types both in ascertaining candidate actions and in the subsequent evaluation of these candidate actions results in the action ultimately performed by the robot being more likely to actually advance the processing of the predetermined task. In order to actuate a robot, it is generally not practical to train a language model of a type and complexity comparable with, for example, the well-conventional GPT-3 model. Rather, as previously explained, an existing model is used that has been trained with a large amount of everyday texts. Many of these everyday texts are outside the context of the technical application envisaged within the framework of the method. This favors associations that obviously have nothing to do with the technical application. Such unusable associations can be avoided from the outset by additionally considering the object types or can be suppressed when evaluating the candidate actions.

At the same time, the additional consideration of object types makes it possible to use more of the knowledge learned in the language model. For example, the language model will contain knowledge about which terms are synonyms or generic terms of which other terms. For example, the language model knows which objects fall under the generic terms "fruits" or "tools." This means that the next tasks can be planned directly based on the task of "collecting all fruits", for example, without first having to specify what exactly is meant by "fruits." Likewise, knowledge can be combined that is associated with different terms that all refer to the same object. A generically trained language model has seen many possible terms for one and the same object. Some of the knowledge contained therein with regard to soldering irons is associated, for example, with the term "soldering iron", some with "soldering tool" and some with "soldering device."

In a particularly advantageous embodiment of the present invention, after the selected candidate action is performed, a branch back is made to re-capture an image of the scene. In this way, the predetermined task can be processed iteratively. For example, if all the fruits have to be collected, after the first fruit has been picked up, the scene will have changed so that there is one less fruit. In addition, other fruits may have been displaced, for example, by the robot's work. All this can be captured with the new image, which can otherwise be processed in a completely analogous manner to the first one.

In a further particularly advantageous embodiment of the present invention, a candidate action consists in determining that the predetermined task has already been completely processed in the current scene. For example, if the task is to collect all the fruits and the image of the scene no longer contains any objects that can be subsumed under the term "fruit," it can be concluded that there is nothing left to collect. Taking object types into account therefore provides a more precise signal as to when the task has been completed.

As explained above, in a particularly advantageous embodiment of the present invention, the predetermined task comprises performing a predetermined action with all instances of objects that fall under a predetermined generic term. For each object instance for which an object type is available, the language model can then answer the question as to whether this object type falls under the predetermined generic term.

In a further particularly advantageous embodiment of the present invention, descriptor vectors having a predetermined length D are ascertained for the pixels of the image using a trained encoder model. At least one of these descriptor vectors is linked to one of the ascertained object types. In this way, any information about the object beyond its position in the image can be encoded and made available for processing by the robot.

For example, in a particularly advantageous embodiment of the present invention, an encoder model can be selected that is trained with the goal of making the descriptor vectors invariant to at least one transformation of the image that does not change the semantic content of the image. Thus, if a first image and a second image resulting from the first image through transformation are each fed to the encoder model, substantially the same descriptor vector is assigned to the same point on the object for both images. The only requirement for this is that this point is visible in both images and is not hidden in the second image. Examples of transformations that leave the semantic content of the image unchanged include exposure and/or color changes, movements and/or rotations of objects, and shadows.

In this way, certain points can be found again and again, even across a plurality of consecutive images of the scene. This can be used, for example, to move the robot to this point.

Thus, in a further particularly advantageous embodiment of the present invention, at least one candidate action includes moving the robot to a point and/or an object designated by a descriptor vector. So, for example, if a decision is made to approach a certain object based on a first image, this object can be approached without a new search after the second image has been captured and processed with the trained encoder model.

A point, for example, at which an object is to be grasped by the robot can be selected as a point designated by the descriptor vector. In particular, microelectronic components cannot be gripped equally by the robot at every point. For example, integrated circuits (ICs) are best gripped on housing sides where no pins protrude from the housing in order to avoid bending the pins or introducing static electricity into the circuit via the pins.

In a further particularly advantageous embodiment of the present invention, a state is ascertained in addition to the object type for at least one object. This state will then also be included in the evaluation of the candidate actions. The state can, for example, relate to any physical state variable, such as the state of aggregation or the temperature. However, the state can also relate, for example, to a processing state. In this way, a meaningful sequence of processing steps can be obtained. For example, when preparing a vegetable soup, the probability of success for the step of "cooking vegetables" may depend on whether the vegetables have been chopped and, if necessary, peeled beforehand. Likewise, for example, the probability of success for the step of "pureeing soup" may depend on whether the vegetables have been cooked sufficiently soft beforehand.

In a further particularly advantageous embodiment of the present invention, the predetermined task comprises the assembly of a plurality of individual parts to form a product to be manufactured and/or sorting of individual parts. For this type of task, it is particularly important to pick up objects of the right type with the robot at all times.

The same applies in a further particularly advantageous embodiment of the present invention in which the predetermined task comprises a plurality of successive steps and at least one of these steps requires the use of one or more tools. In the context of such tasks, the progress metric and the success metric may also depend on whether all prerequisites for a next step are met.

The method according to the present invention can in particular be wholly or partially computer-implemented. For this reason, the present invention also relates to a computer program comprising machine-readable instructions which, when executed on one or more computers, cause said computer(s) to carry out the method described above. In this sense, control devices for vehicles and embedded systems for technical devices, which are also capable of executing machine-readable instructions, are also to be regarded as computers.

The present invention also relates to a machine-readable data carrier and/or to a download product comprising the computer program. A download product is a digital product that can be transmitted via a data network, i.e., can be downloaded by a user of the data network, and can, for example, be offered for immediate download in an online shop.

Furthermore, a computer can be equipped with the computer program, with the machine-readable data carrier, or with the download product.

Further measures improving the present invention are explained in more detail below, together with the description of the preferred exemplary embodiments of the present invention, with reference to figures.

DETAILED DESCRIPTION OF EXAMPLE EMBODIMENTS

Figure 1:
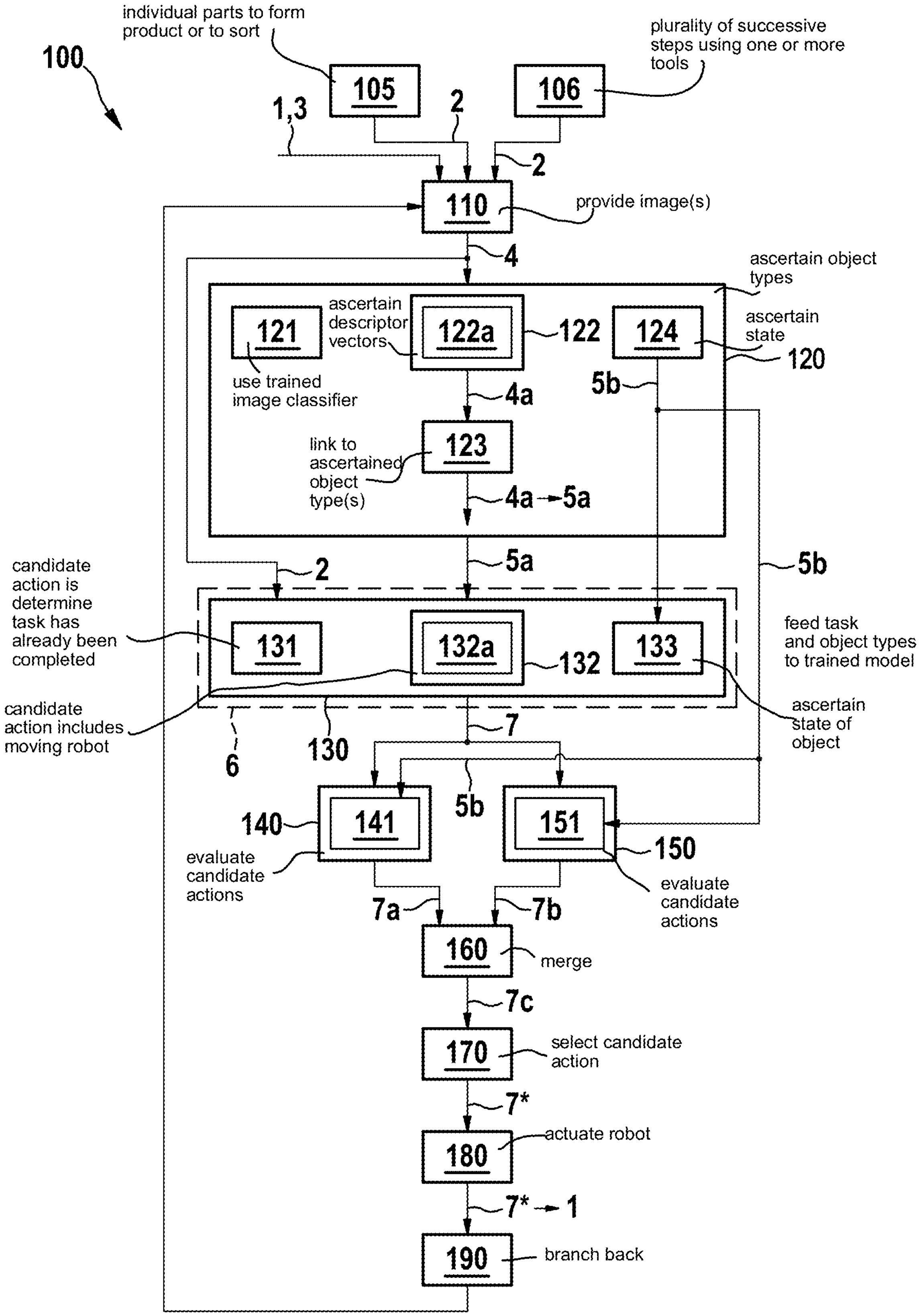
FIG. 1 shows an exemplary embodiment of the method 100 for actuating a robot 1, according to the present invention.

FIG. 1 is a schematic flowchart of an exemplary embodiment of the method 100 for actuating a robot to perform a predetermined task 2 in a scene 3.

According to block 105, the predetermined task 2 can in particular comprise, for example, the assembly of a plurality of individual parts to form a product to be manufactured and/or sorting of individual parts.

According to block 106, the predetermined task 2 can in particular comprise, for example, a plurality of successive steps, wherein at least one of these steps requires the use of one or more tools.

In step 110, at least one image 4 of the scene 3 in which the task 2 is to be performed is provided.

In step 120, object types 5*a* are ascertained for one or more objects 5 in the image 4.

According to block 121, at least one object type 5*a* can be ascertained using a trained image classifier. However, as explained above, the benefits of considering object types 5*a* are achieved regardless of the degree to which their ascertainment is automated.

According to block 122, descriptor vectors 4*a* having a predetermined length D can be ascertained for the pixels of the image 4 using a trained encoder model. According to block 123, at least one of these descriptor vectors 4*a* can then be linked to one of the ascertained object types 5*a*.

According to block 122*a*, in particular, for example, an encoder model can be selected that is trained with the goal of making the descriptor vectors 4*a* invariant to at least one transformation of the image 4 that does not change the semantic content of the image 4.

According to block 124, a state 5*b* can be ascertained in addition to the object type 5*a* for at least one object 5.

In step 130, the task 2 is fed in combination with the object types 5*a* to a trained language model 6, whereupon the trained language model 6 outputs a plurality of candidate actions 7.

According to block 131, at least one candidate action 7 can consist in determining that the predetermined task 2 has already been completely processed in the current scene 3.

According to block 132, at least one candidate action 7 can include moving the robot 1 to a point and/or an object 5 designated by a descriptor vector 4*a*.

In this case, according to block 132*a*, in particular, for example, at least one point at which an object 5 is to be grasped by the robot 1 can be selected as a point that is designated by the descriptor vector 4*a*.

According to block 133, a state 5*b* of the object 5 ascertained together with the object type 5*a* can also be included in the selection of candidate actions 7. For example, the language model 6 can already determine that an object 5 is in the “raw” state and then no longer associate it with candidate objects 7 that require the “cooked” state.

In step 140, the candidate actions 7 are evaluated on the basis of the current scene 3 and the object types 5*a* ascertained therefrom with a predetermined progress metric 7*a* to determine the extent to which the performance of the particular candidate action 7 promises progress with regard to the predetermined task 2. It is therefore evaluated to what extent the candidate action 7, if successful, contributes to the complete processing of the predetermined task 2. For example, adding an unnecessary or even completely unsuitable ingredient does not advance the preparation of a vegetable soup as a predetermined task 2; on the contrary, it can even detract from the complete processing if the vegetable soup becomes unusable and the preparation has to be started again.

According to block 141, an object state 5*b* can also be included in the progress metric 7*a*. For example, nuts may well be a suitable ingredient for a vegetable soup, but only if they are chopped and their hard shells are removed. However, adding the same nuts in their original state with their hard shells keeps the desired flavor of the nuts out of the vegetable soup and endanger the teeth.

In step 150, the candidate actions 7 are evaluated on the basis of the current scene 3 and the object types 5*a* ascertained therefrom with a predetermined success metric 7*b* to determine the probability with which an attempt to perform the candidate action 7 will be successful. For example, if potatoes are to be pressed through a potato press to add them to a vegetable soup, this is more likely to be successful with the “floury potato” object type than with the “waxy potato” object type.

According to block 151, the object state 5*b* can also be included in the success metric 7*b*. For example, pressing a raw potato through the potato press is unlikely to be successful, even if the potato is floury. In the cooked object state, however, the potato press can handle the potato.

In step 160, the values of the progress metric 7*a* and the success metric 7*b* relating to the candidate action 7 are merged to form an overall rating 7*c* of the candidate action 7. As previously explained, this does not have to be a simple aggregation, but can, for example, require a positive contribution from candidate action 7 to the complete processing of the predetermined task 2. An action that does not advance this processing (such as “stirring the whole packet of salt into the soup”) does not become useful just because it practically always succeeds.

In step 170, a candidate action 7 having the best overall rating 7*c* is selected. This selected candidate action is designated by the reference sign 7*.

In step 180, the robot 1 is actuated to perform the selected candidate action 7*.

In step 190, after the selected candidate action 7* is performed, a branch back is made to re-capture an image 4 of the scene 3. This means that the method can be carried out iteratively until the predetermined task 2 is completely processed.

Figure 2:
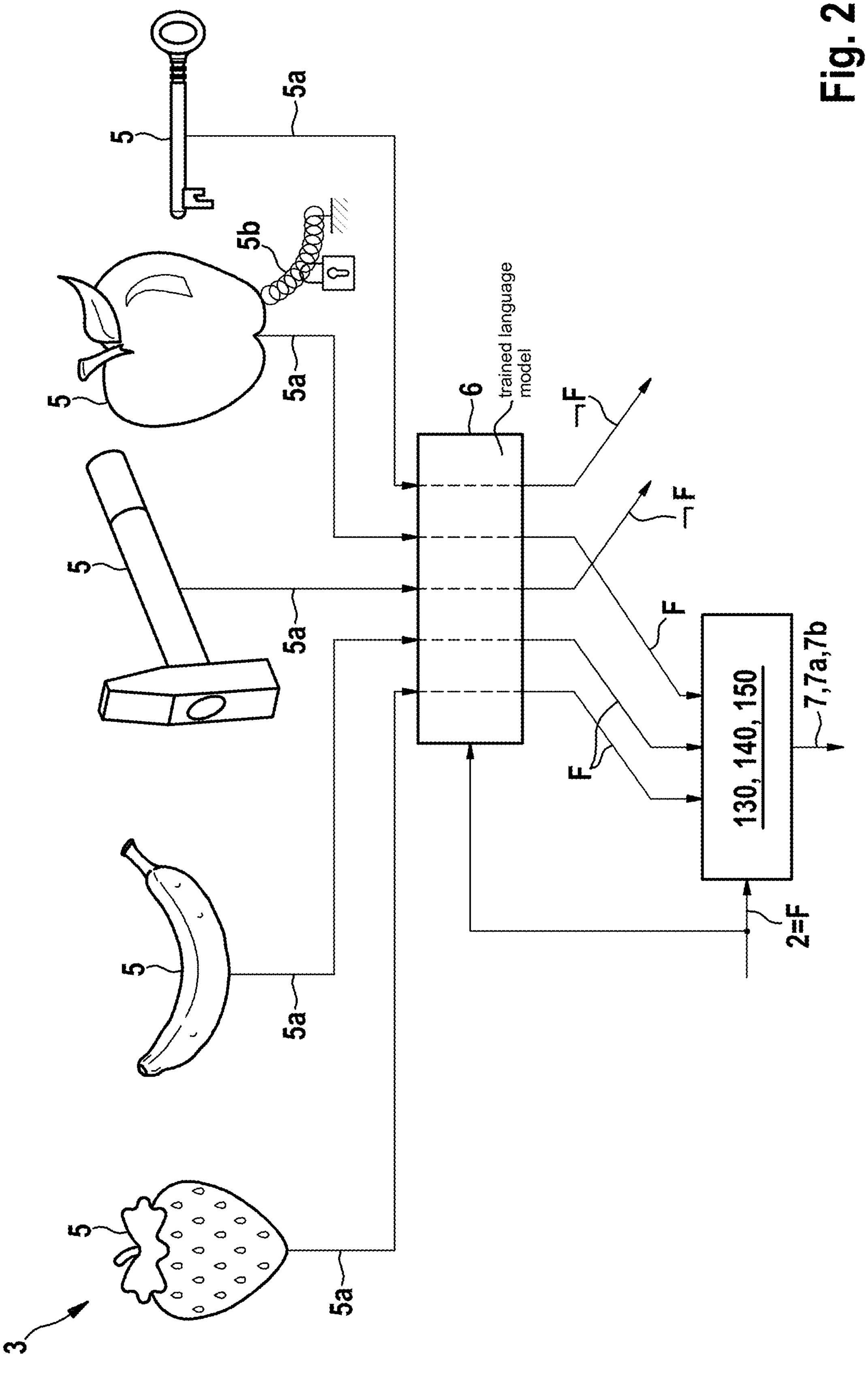
FIG. 2 is an illustration of the consideration of object types 5*a* in the selection and evaluation of candidate actions 7 within the framework of the method 100, according to the present invention.

FIG. 2 illustrates how, within the framework of the method 100, the consideration of object types 5*a* helps in the selection and evaluation of candidate actions 7.

In the example shown in FIG. 2, the scene 3 contains five objects 5 of different object types 5*a*, namely a strawberry, a banana, a hammer, an apple and a key. The predetermined task 2 involves collecting all fruits (abbreviated as F).

This predetermined task 2 is communicated to the language model 6. The language model 6 can then use the object types 5*a* to decide directly whether the particular object 5 is a fruit (F) or not (¬F). In the example shown in FIG. 2, the strawberry, the banana and the apple are subsumed under the generic term “fruits,” but the hammer and the key are not.

Thus, for each candidate action 7 that refers to “all fruits,” it is clear what is meant. The candidate actions 7 can then be evaluated with regard to the promised progress (progress metric 7*a*) and with regard to the chances of success (success metric 7b) using the particular object type 5a and optionally also the particular object state 5b.

In the simple example shown in FIG. 2, picking up any fruit (strawberry, banana or apple) would contribute equally to solving task 2 of collecting all the fruits. However, there are differences in the chances of success.

On the one hand, a fruit (such as a strawberry) may not be easily accessible if another fruit (such as a banana) is also present. For example, the banana may completely or partially cover the strawberry. In a situation where both the strawberry and the banana are still present, the candidate action 7 of "grabbing a banana" has a higher probability of success than the candidate action 7 of "grabbing a strawberry."

On the other hand, the chances of success may also depend on the particular object state 5b. In the example shown in FIG. 2, the object state 5b of the apple comprises that it is chained with a lock. Grabbing the apple would not be successful, even though it would help in collecting all the fruits. Rather, as an intermediate step, it would be necessary to first unlock the lock and thus free the apple for removal.

What is claimed is:

1. A method for actuating a robot to perform a predetermined task, the method comprising the following steps:
- providing at least one image of a scene in which the task is to be performed;
- ascertaining object types for one or more objects in the image;
- feeding the task in combination with the object types to a trained language model, whereupon the trained language model outputs a plurality of scene-specific candidate actions describing alternative ways of interacting with the objects in the scene;
- based on the current scene and the object types ascertained therefrom:
  - evaluating each of the candidate actions with a predetermined progress metric that quantifies an expected degree to which execution of the respective candidate action advances completion of the predetermined task irrespective of feasibility of execution, and
  - evaluating each of the candidate actions with a predetermined success metric that quantifies a likelihood that execution of the respective candidate action will succeed in the current scene given physical, geometric, or operational constraints;
- for each of the candidate actions, merging respective values of the progress metric and the success metric relating to the candidate action into a respective overall rating of the respective candidate action, wherein the merging comprises:
  - semantically evaluating the progress metric of the respective candidate action in accordance with one or more progress-related conditions that are specific to advancement of predetermined task;
  - semantically evaluating the success metric of the respective candidate action in accordance with one or more success-related conditions that are specific to likelihood of successful execution of the respective candidate action in the current scene; and
  - jointly determining the overall rating of the respective candidate action based on outcomes of the progress-related evaluation and the success-related evaluation, such that failure to satisfy either the progress-related conditions or the success-related conditions is sufficient to disfavor or exclude the respective candidate action;
- comparing the overall ratings of the candidate actions;
- based on a result of the comparison, selecting one of the candidate actions as having a best overall rating; and
- actuating the robot to perform the selected candidate action.

2. The method according to claim 1, wherein after the selected candidate action is performed, a branch back is made to re-capture an image of the scene.

3. The method according to claim 1, wherein at least one candidate action includes determining that the predetermined task has already been completely processed in the current scene.

4. The method according to claim 1, wherein the predetermined task includes performing a predetermined action with all instances of objects that fall under a predetermined generic term.

5. The method according to claim 1, wherein at least one of the object types is ascertained using a trained image classifier.

6. The method according to claim 1, wherein:
- a trained encoder model is used to ascertain descriptor vectors having a predetermined length for pixels of the image, and
- at least one of the descriptor vectors is linked to one of the ascertained object types.

7. The method according to claim 6, wherein the encoder model is trained with a goal of making the descriptor vectors invariant to at least one transformation of the image that does not change a semantic content of the image.

8. The method according to claim 6, wherein at least one of the candidate actions includes moving the robot to a point and/or an object designated by a descriptor vector.

9. The method according to claim 8, wherein at least one point at which an object is to be grasped by the robot is selected as the point that is designated by the descriptor vector.

10. The method according to claim 1, wherein:
- a state is ascertained in addition to the object type for at least one object, and
- the state is also included in the selection and evaluation of candidate actions.

11. The method according to claim 1, wherein the predetermined task includes: (i) assembling a plurality of individual parts to form a product to be manufactured, and/or (ii) sorting individual parts.

12. The method according to claim 1, wherein the predetermined task includes a plurality of successive steps and at least one of the steps requires use of one or more tools.

13. The method according to claim 1, wherein semantically evaluating the progress metric comprises filtering or eliminating candidate actions from language model output that are semantically irrelevant to the predetermined task based on the ascertained object types.

14. The method according to claim 1, wherein a respective one of the candidate actions is excluded by condition gating due to failure to satisfy the progress-related or by condition gating due to failure to satisfy the success-related conditions.

15. The method according to claim 1, further comprising:
- ascertaining, using a trained encoder model, descriptor vectors for pixels of the image, the image being a first image;
- after the selected candidate action is performed, capturing a new image of the scene;
- ascertaining, using the trained encoder model, descriptor vectors for pixels of the new image;

for each of at least one of the descriptor vectors of the new image, matching the respective descriptor vector to a respective one of the descriptor vectors of the first image, wherein the encoder model is trained so that descriptor vectors for invariance of a same semantic point on an object across image transformations; and based on the matching, identifying a same semantic point across the first image and the new image to thereby parameterize a candidate action directed to that point.

16. A non-transitory machine-readable data carrier on which is stored a computer program including machine-readable instructions for actuating a robot to perform a predetermined task, the instructions, when executed by one or more computers and/or compute instances, causing the one or more computers and/or compute instances to perform the following steps:

providing at least one image of a scene in which the task is to be performed;

ascertaining object types for one or more objects in the image;

feeding the task in combination with the object types to a trained language model, whereupon the trained language model outputs a plurality of scene-specific candidate actions describing alternative ways of interacting with the objects in the scene;

based on the current scene and the object types ascertained therefrom:

evaluating each of the candidate actions with a predetermined progress metric that quantifies an expected degree to which execution of the respective candidate action advances completion of the predetermined task irrespective of feasibility of execution, and evaluating each of the candidate actions with a predetermined success metric that quantifies a likelihood that execution of the respective candidate action will succeed in the current scene given physical, geometric, or operational constraints;

for each of the candidate actions, merging respective values of the progress metric and the success metric relating to the candidate action into a respective overall rating of the respective candidate action, wherein the merging comprises:

semantically evaluating the progress metric of the respective candidate action in accordance with one or more progress-related conditions that are specific to advancement of predetermined task;

semantically evaluating the success metric of the respective candidate action in accordance with one or more success-related conditions that are specific to likelihood of successful execution of the respective candidate action in the current scene; and jointly determining the overall rating of the respective candidate action based on outcomes of the progress-related evaluation and the success-related evaluation, such that failure to satisfy either the progress-related conditions or the success-related conditions is sufficient to disfavor or exclude the respective candidate action;

comparing the overall ratings of the candidate actions;

based on a result of the comparison, selecting one of the candidate actions as having a best overall rating; and actuating the robot to perform the selected candidate action.

17. One or more computers and/or compute instances having a non-transitory machine-readable data carrier on which is stored a computer program including machine-readable instructions for actuating a robot to perform a predetermined task, the instructions, when executed by the one or more computers and/or compute instances, causing the one or more computers and/or compute instances to perform the following steps:

providing at least one image of a scene in which the task is to be performed;

ascertaining object types for one or more objects in the image;

feeding the task in combination with the object types to a trained language model, whereupon the trained language model outputs a plurality of scene-specific candidate actions describing alternative ways of interacting with the objects in the scene;

based on the current scene and the object types ascertained therefrom:

evaluating each of the candidate actions with a predetermined progress metric that quantifies an expected degree to which execution of the respective candidate action advances completion of the predetermined task irrespective of feasibility of execution, and evaluating each of the candidate actions with a predetermined success metric that quantifies a likelihood that execution of the respective candidate action will succeed in the current scene given physical, geometric, or operational constraints;

for each of the candidate actions, merging respective values of the progress metric and the success metric relating to the candidate action into a respective overall rating of the respective candidate action, wherein the merging comprises:

semantically evaluating the progress metric of the respective candidate action in accordance with one or more progress-related conditions that are specific to advancement of predetermined task;

semantically evaluating the success metric of the respective candidate action in accordance with one or more success-related conditions that are specific to likelihood of successful execution of the respective candidate action in the current scene; and jointly determining the overall rating of the respective candidate action based on outcomes of the progress-related evaluation and the success-related evaluation, such that failure to satisfy either the progress-related conditions or the success-related conditions is sufficient to disfavor or exclude the respective candidate action;

comparing the overall ratings of the candidate actions;

based on a result of the comparison, selecting one of the candidate actions as having a best overall rating; and actuating the robot to perform the selected candidate action.

* * * * *